April 1, 1958 A. J. FROMBERG 2,828,657
TUBELESS TIRE REPAIR PLUG APPLICATOR
Filed Sept. 30, 1955
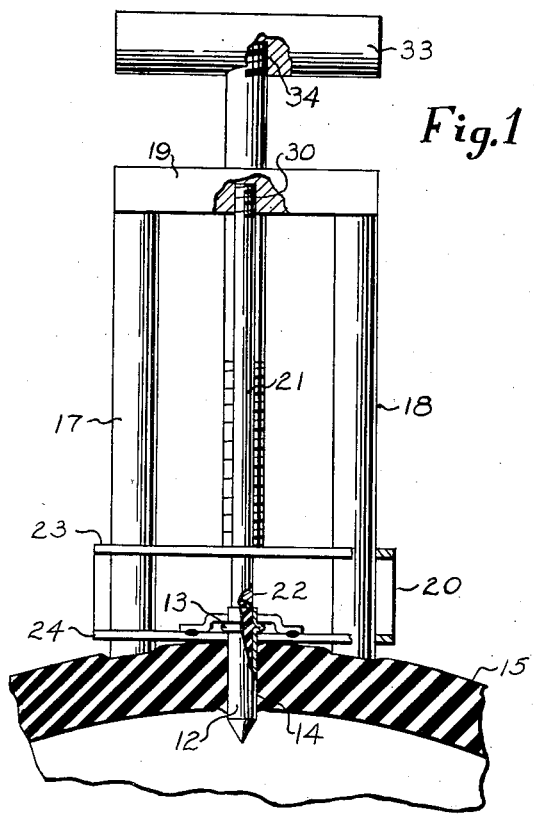
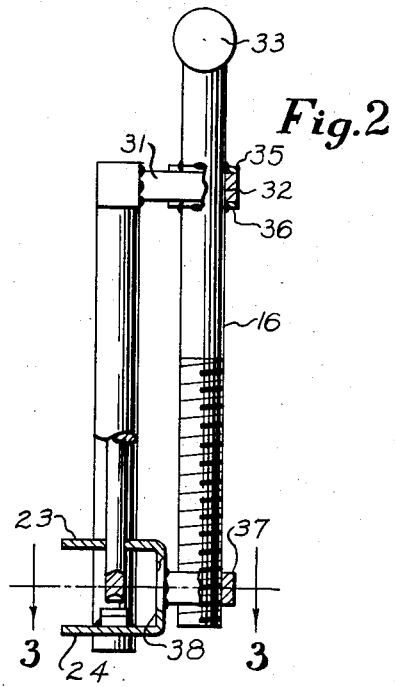
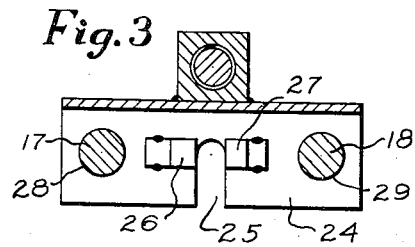
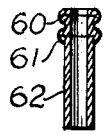
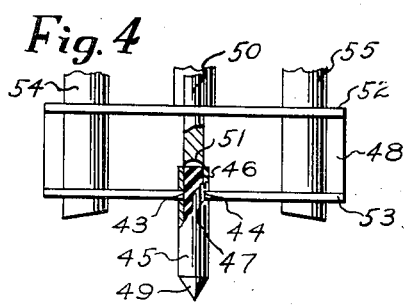
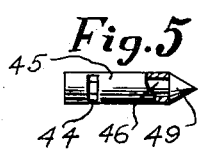
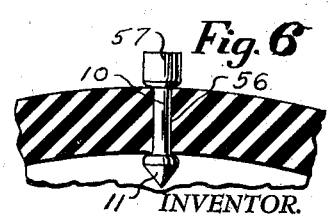
INVENTOR.
Aaron J. Fromberg
BY *Victor J. Evans & Co.*
ATTORNEYS

United States Patent Office 2,828,657
Patented Apr. 1, 1958

2,828,657
TUBELESS TIRE REPAIR PLUG APPLICATOR

Aaron J. Fromberg, Gorman, Calif., assignor to Fromberg, Inc., Gorman, Calif., a corporation of California Application September 30, 1955, Serial No. 537,636

3 Claims. (Cl. 81—15.7)

This invention relates to the repair of motor vehicle tires particularly of the tubeless type, and in particular, a machine for inserting a rubber plug having a conical shaped point extended from one end of a stem in a tire and having a tube or shell positioned on the stem, wherein the plug is forced through an opening, such as a nail hole, in a tire and wherein with rubber cement on the plug and with the plug retained in the opening by a plunger the shell is withdrawn leaving the plug cemented in the tire sealing the opening.

The purpose of this invention is to provide a repair kit whereby openings in tubeless tires may be sealed without removing the tires from the wheels.

With the increasing popularity of tubeless tires, the necessity of providing means for repairing the tires increases and because the tires are sealed on rims of wheels it is essential that repairs be made without removing the tires from the rims of the wheels. With this thought in mind, this invention contemplates a machine having an elongated threaded rod or screw rotatably mounted in a head with a traveler threaded on the screw and prevented from rotation by guide means and a plunger carried by the head and extended through a plug retaining socket in the traveler whereby a plug secured in the traveler may be injected through an opening in a tire and a shell on the plug may be withdrawn with the plunger holding a stem of resilient material in the opening of the tire.

The object of this invention is, therefore, to provide means for installing a rubber plug in a motor vehicle tire whereby the plug seals an opening through the tire.

Another object of the invention is to provide a machine for forcing a sealing plug of resilient material through openings in motor vehicle tires in which an enlarged end of the plug is retained on the inside of the tire with the body of the plug positioned in the opening through the tire.

Another important object of the invention is to provide means for retaining a relatively soft resilient plug in an extended position as the plug is forced through a motor vehicle tire to seal an opening therein.

A further object of the invention is to provide a tool for inserting rubber plugs in punctures or openings of tubeless tires that is adapted to be actuated by the average layman and that is of a simple and economical construction.

With these and other objects and advantages in view, the invention embodies an applicator for holding a plug including a thin shell filled with resilient material whereby the plug is inserted by the applicator through an opening in a tire and the shell withdrawn leaving the resilient material in the opening.

Other features and advantages of the invention will appear from the following description, taken in connection with the drawing, wherein:

Figure 1 is a front elevational view of the applicator for inserting a plug in a tire with parts broken away and parts shown in section showing the device positioned over a shell of a plug in a tire, the tire being shown in section.

Figure 2 is an end elevational view of the machine shown in Figure 1 with the shell and tire omitted.

Figure 3 is a sectional plan through the applicator taken on line 3—3 of Figure 2.

Figure 4 is a front elevational view similar to that shown in Figure 1 showing the extracting element of the applicator illustrating a modification wherein the sides of the shell are provided with notches into which portions of the lower part of the applicator extend for gripping the shell.

Figure 5 is a view showing one of the plugs with a shell of the modified form on the stem thereof and with part of the shell broken away and the remaining part shown in section.

Figure 6 is a section through the outer wall of a motor vehicle tire showing a plug of rubber or other suitable elastic material filling an opening therein.

Figure 7 is a vertical section through another modified form of a shell of a plug, the shell being provided with gripping means by which the shell is held in the applicator.

Referring now to the drawing, wherein like reference characters denote corresponding parts, the improved tubeless tire repairing applicator and plug of this invention includes a plug 10 with an end 11, and a shell or sleeve 12 having a collar or rim 13 on the outer end, with the shell positioned in an opening 14 in a tire 15, being gripped in a machine or applicator whereby it is injected into an opening 14 of a tire 15, the applicator including a screw 16 in a frame having posts 17 and 18, a crosshead 19, a traveler 20 and a plunger 21, and a concave lower end 22 of the plunger holding the plug 10 in the opening as the shell 12 is withdrawn by the applicator leaving the plug in the tire and in the position shown in Figure 9.

The traveler 20 is provided with an upper flange 23 and a lower flange 24 and, as illustrated in Figure 3, the lower flange 24 is provided with a plug or rim receiving slot or socket 25. Clip angles 26 and 27, positioned on opposite sides of the slot provides a rim receiving or shell gripping socket and the angles are positioned to grip the collar or rim 13 of the shell or tube 12 whereby with the shell positioned in the slot or opening 25 the collar 13 is retained between the clip angles 26 and 27 and the flange 24 so that upward movement of the traveler with the plunger holding the plug withdraws the shell from the opening 14 of the tire. The flange 24 is provided with openings 28 and 29 through which the rods 17 and 18 slidably extend and similar openings are provided in the upper flange 23. The plunger 21, which is positioned in alignment with the plug 10 and shell 12, is threaded in the crosshead 19 as shown at the point 30 and the lower part of the plunger extends slidably through an opening in the upper flange 23.

The crosshead 19 is provided with an arm 31 having an opening 32 therein and the upper portion of the screw 16 extends through the opening and is rotatable therein. The upper end of the rod or shank of the screw 16 is provided with a handle 33 that is threaded on the shank as shown at the point 34. The shank is also provided with washers 35 and 36 that are secured to the shank, such as by welding, and with the washers positioned against upper and lower surfaces of the arm 31 the screw is retained against axial displacement, as shown in Figure 2.

The lower end of the screw is threaded in a collar 37 which extends from a back 38 of the traveler 20 and with the parts positioned as shown rotation of the screw causes the traveler to move upwardly or downwardly as may be desired.

According to the modified form of the invention the shells may be provided with notches 43 and 44 as shown in the sides of a shell 45 on a plug 46 positioned in a slot 47 of a carrier 48, as shown in Figure 4. In this design the lower end of the plug is also provided with a conical shaped head 49 and the lower end of a plunger 50, similar to the plunger 21, is provided with a concave surface 51. The traveler 48 is provided with an upper flange 52 and a lower flange 53 and the flanges are slidably mounted on posts 54 and 55.

With the parts provided as illustrated in Figure 4, a shell with a plug therein is inserted in the slot 47 with edges of the flange 53 in the notches 43 and 44 and with the shell supported in this manner it is drawn upwardly with the traveler 48 as the screw, such as the screw 16, is rotated.

With rubber cement on the stem of the plug, the sleeve or shell 12 or 45 is readily removed whereby the rubber cement is in direct contact with the material of the tire.

The plug assembly, particularly as illustrated in Figure 5, is pressed through an opening, such as the opening 14 shown in Figure 1, or the opening 56, shown in Figure 9, by holding the outer end of the plug in the traveler and forcing the point through the opening. The outer surface of the plug, such as the plug 10 shown in Figure 6, is covered with rubber cement and upon withdrawal of the shell or sleeve 12 or 45 the plug is retained in position by the plunger 21 or 45 and end 11 or 49.

With the shell or sleeve of the plug formed, as it is illustrated in Figure 1, or as shown in Figures 4 and 5, the plug with the shell or sleeve thereon is secured in the traveler 20 and forced through a nail hole or other opening in a tire or shoe and with the parts in position the screw jack or frame is placed against the outer surface of the tire with the collar 13 between the clips 26 and 27 and flange 24 or with edges of the flange at the sides of the slot 47 extended into the notches 43 and 44 of the shell 45 and upon rotation of the screw 16 the shell is withdrawn with the shell passing over the plunger 21 or 50 by which the plug stem is retained in the tire. With the surface of the plug 10 covered with rubber cement or other suitable adhesive and with the end 11 on the inside of the tire the plug is definitely retained in the opening of the tire and the plug will remain in position, sealing the opening, indefinitely.

The sleeve or shell may also be provided with a second collar as indicated by the numeral 60 which is spaced above a collar 61 on a sleeve 62, as shown in Figure 7. The collars 60 and 61 are positioned to straddle the flange 24 or clip angles 26 and 27 of the carrier 20 whereby the sleeve is secured in the carrier.

It will be understood that other modifications, within the scope of the appended claims, may be made in the design and arrangement of the parts without departing from the spirit of the invention.

What is claimed is:

1. In a tire repair plug applicator for the insertion of a shell confined treated plug into a hole of the tire, said shell having an external rim at one end thereof, the combination which comprises an elongated screw, a traveler threaded on the screw and having an opening with a rim receiving socket therein, a head in which one end of the screw is rotatably mounted, means for limiting longitudinal movement of the screw in the head, a plunger carried by the head, and positioned in alignment with the opening of the traveler whereby upon rotation of the screw in one direction, the traveler passes over the plunger with the plunger forcing a plug in a shell, the rim of which is retained in the rim receiving socket of the traveler, from the shell, and guide means for the traveler.

2. In a tubeless tire repair plug applicator for the insertion of a shell confined treated plug into a hole of the tire, said shell having an external rim at one end thereof, the combination which comprises an elongated screw having a handle on the upper end, a traveler threaded on the screw and having an opening with a rim receiving socket therein, said opening opening through one side of the traveler, a head in which one end of the screw is rotatably mounted, means for limiting longitudinal movement of the screw in the head, a plunger carried by the head and positioned in alignment with the opening of the traveler whereby upon rotation of the screw in one direction, the traveler passes over the plunger, and a supporting device on which the head is mounted and said supporting device providing a guide for preventing rotation of the traveler.

3. In a tubeless tire repair plug applicator for the insertion of a shell confined treated plug into a hole of the tire, said shell having an external rim at the upper end thereof, parallel vertically disposed spaced guides, a cross head extended across and integral with the guides, a screw having a handle on the upper end rotatably mounted in the cross head, a traveler slidably mounted in the guides and threaded on the screw, the traveler having a shell gripping socket therein, a plunger carried by the cross head and extended through the traveler, the plunger being aligned with the shell gripping socket in the traveler whereby with the guides positioned against the face of a tire rotation of the screw withdraws a shell having a plug of resilient material therein from the tire with the plunger retaining the plug of resilient material in an opening from which the shell is extracted.

References Cited in the file of this patent
UNITED STATES PATENTS

| | | |
|---|---|---|
| 583,438 | Hatch | May 25, 1897 |
| 725,171 | Sutton | Apr. 14, 1903 |
| 1,545,831 | Hirst | July 14, 1925 |
| 1,859,305 | Littlefield | May 24, 1932 |